United States Patent [19]
Jones, Jr. et al.

[11] Patent Number: 5,794,890
[45] Date of Patent: Aug. 18, 1998

[54] SHIELDED RADIATOR

[75] Inventors: Leo H. Jones, Jr., Rancho Palos Verdes; Christopher J. Cooper, Lakewood, both of Calif.

[73] Assignee: Hughes Electronics Corporation, Los Angeles, Calif.

[21] Appl. No.: 577,445

[22] Filed: Dec. 22, 1995

[51] Int. Cl.⁶ .................................................. B64G 1/50
[52] U.S. Cl. ........................................ 244/163; 16/250
[58] Field of Search .......................... 165/41, 104.14, 165/171; 244/163; 16/250, 223

[56] References Cited

U.S. PATENT DOCUMENTS

| | | | |
|---|---|---|---|
| 2,557,716 | 6/1951 | Allee | 16/250 |
| 2,680,534 | 6/1954 | Penfold | 16/250 |
| 4,069,811 | 1/1978 | Tabor | 165/171 |
| 4,388,964 | 6/1983 | Almgren et al. | 165/32 |
| 4,420,035 | 12/1983 | Hewitt | 165/32 |
| 4,635,710 | 1/1987 | Shelley | 165/171 |
| 4,738,304 | 4/1988 | Chalmers et al. | 165/13 |
| 5,027,892 | 7/1991 | Bannon et al. . | |
| 5,111,550 | 5/1992 | LeBlanc | 16/223 |
| 5,117,901 | 6/1992 | Cullimore . | |

OTHER PUBLICATIONS

European Search Report, Application No. EP 96 12 0416, dated Apr. 4, 1997.

*Primary Examiner*—Robert J. Oberleitner
*Assistant Examiner*—Tien Dinh
*Attorney, Agent, or Firm*—Terje Gudmestad; Michael W. Sales

[57] ABSTRACT

A lightweight yet reliable radiator panel is provided for use on spacecraft. The radiator panel includes at least one shield positioned over a first surface of the radiator panel, and pipes for circulating a coolant from inside of the spacecraft to the radiator panel. The pipes are mounted between the panel and the shield, and are located on the first surface at a stand-off distance from the shield.

13 Claims, 3 Drawing Sheets

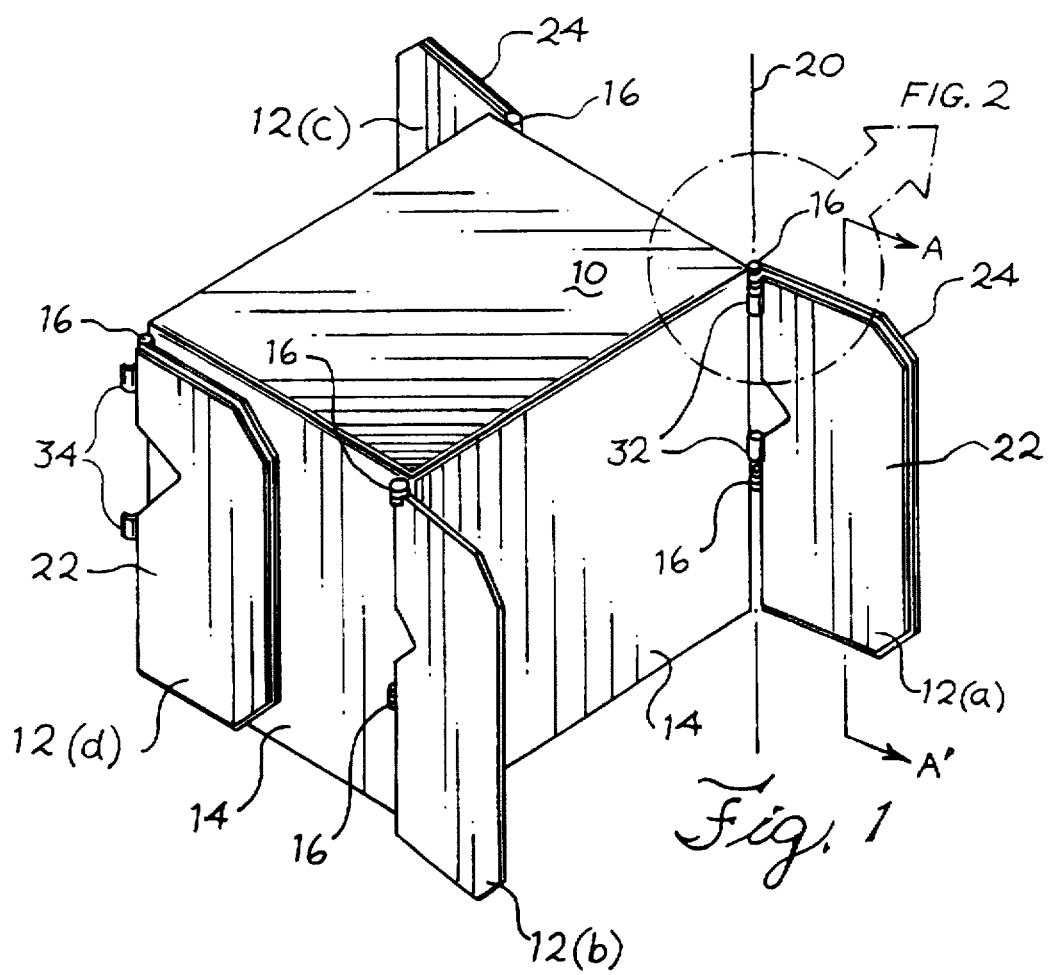
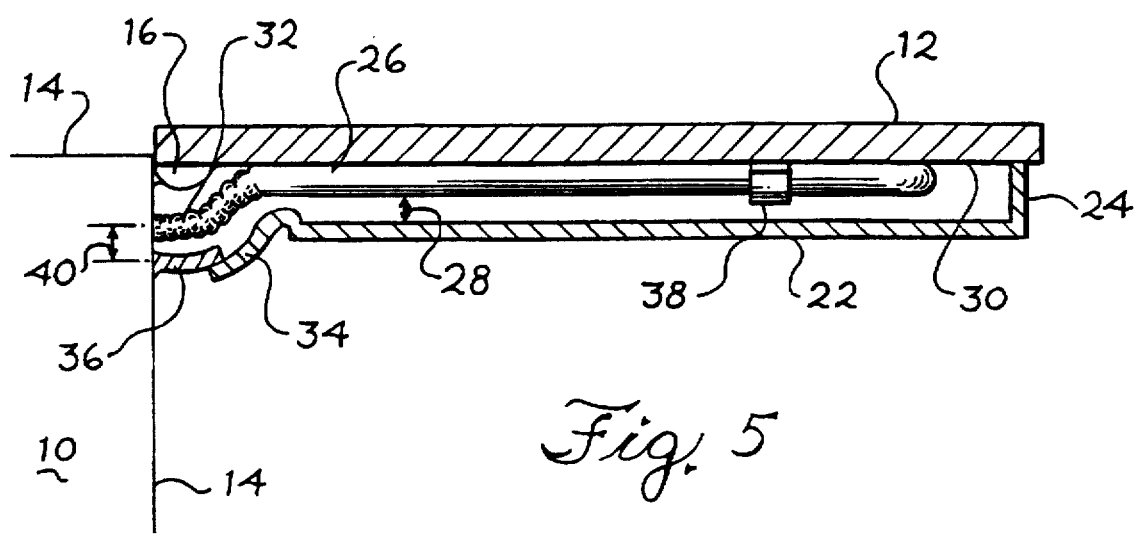

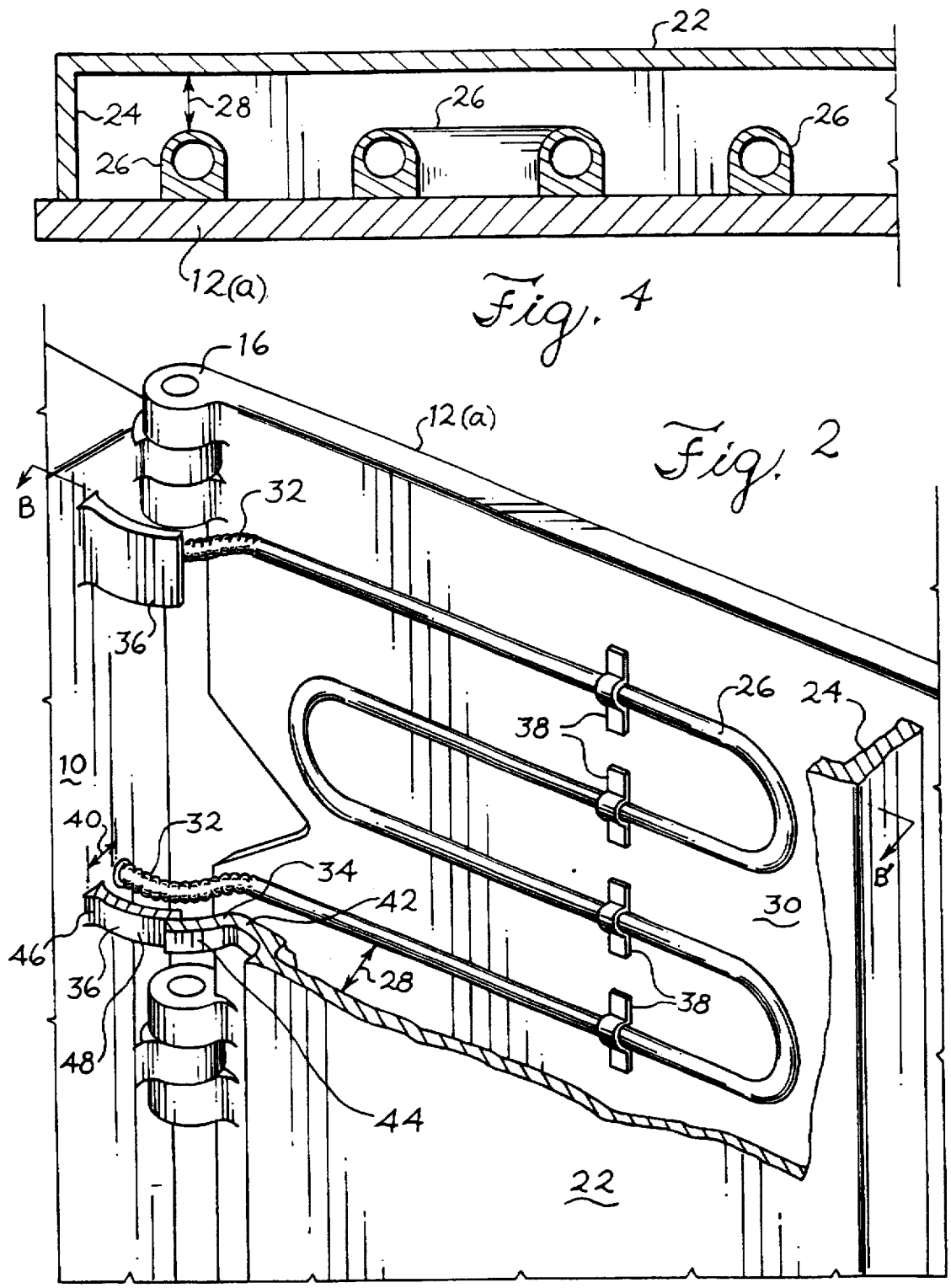

SHIELDED RADIATOR

BACKGROUND OF THE INVENTION

This invention relates in general to radiator panels used in spacecraft. More particularly, it relates to a lightweight and reliable structure and method for protecting radiator panels against contaminants or hazards such as flying debris.

Spacecraft often utilize radiator-based heat dissipation systems to remove excess internal heat generated from various sources such as internal electronic components. A typical radiator-based heat dissipation system includes a configuration of pipes that circulate coolant throughout various portions of the spacecraft. Excess internal heat boils the coolant in a similar fashion to a conventional evaporator. The pipes transport gaseous phase coolant to radiator panels located external to the spacecraft's body (or module). There, the coolant condenses, thereby dissipating unwanted heat. The pipes transport the condensed coolant back through the spacecraft to begin the cycle again.

Radiator panels may be deployable or fixed. Fixed panels are, of course, stationary on the spacecraft, and are typically located within a designated area of the spacecraft. In contrast, deployable radiator panels are attached to and folded against the outside walls of the module. When the spacecraft reaches its intended destination, mechanisms extend each panel away from the module to a deployed position. Deployable panels have the advantage of allowing more surface contact with the coldness of space than fixed or fin panels.

Space debris is a hazard for radiator pipes. Space debris generally includes orbital debris, micrometeoroids, and any other type of projectile that may be encountered in space. If space debris strikes and cracks a pipe, coolant will be lost causing the heat dissipation system to fail.

A known method of protecting radiator pipes from space debris is to provide a relatively thick radiator panel structure that completely covers the radiator pipes. For example, manufacturing such a structure may be accomplished by providing a first panel section and cutting a groove on a surface of the first panel section. The groove is deep enough to house a portion of the radiator pipe such that, when the pipe is securely positioned within the groove, a portion of the pipe is exposed.

The radiator panel can be completed in two ways. First, a similar and complementary groove is cut into the surface of a second panel section. The second panel section is placed on the first panel section so that the exposed pipe fits securely into the second groove. Alternatively, the second panel section is formed by adding panel material to the first panel section until the exposed pipes are sufficiently covered. In either case, the pipe is embedded within the radiator panel, and thereby protected from debris. However, such a configuration requires the combined panel sections be thick enough to cover the pipes and protect them from a direct impact. This adds weight and cost to the spacecraft, and increases launch and deployment costs.

Conserving weight and material decreases a spacecraft's launch and deployment costs. Accordingly, it would be desirable to provide a lightweight radiator panel that provides protection against space debris while conserving material.

SUMMARY OF THE INVENTION

The present invention provides a lightweight yet reliable structure and method for protecting radiator panels from contaminants or hazards such as flying space debris. One aspect of the invention is a shielded spacecraft radiator panel. At least one pipe is attached to a first surface of the radiator panels and one or more shields are positioned over the pipe. There must be a separation, characterized by a stand-off distance, between the shield and the pipe. Two ends of the pipe may be attached to a module on a spacecraft so that a coolant may circulate from the module, to the radiator panel and back to the module. This shielded radiator panel weighs less than known radiator panels, but is just as reliable.

Two configurations are contemplated for shielding the pipe. The first configuration is a one piece shield that covers all of the pipes. Much, if not all, of the first surface of the radiator panel can be shielded in this configuration. The radiator pipe is protected on one side by the radiator panel and on the opposite side by the shield. Although the pipe is in direct contact with the radiator panel, a first stand-off distance separates the pipe and the shield. The edge of the shield may extend from the first stand-off distance to the radiator panel, and thereby encase the heat pipes.

The second configuration uses multiple segments of smaller shields that are arrayed to follow the path of the pipe. This method minimizes the amount of shielding to that which is necessary to cover the pipes and maintain the first stand-off distance between the pipe and the shield. In this configuration, substantial portions of the radiator panel may be exposed. However, impact on the exposed areas of the radiator panel is unlikely to affect the heat dissipating function of the panel.

Another aspect of the invention is a shielded radiator panel having at least one radiator pipe with flexible ends. Each flexible end is set on or about a first edge of the radiator panel. The radiator panel may be attached at the first edge to a module by at least one hinge. Once again the flexible ends of the pipe are attached to the spacecraft such that the spacecraft and the pipes form a circuitous path. This time, the hinge and the flexible ends provide a freedom of movement required to store the radiator panel against a wall of the module. At the same time, this freedom of movement also allows the radiator panel to swing on the hinge axis to a deployed position. At the deployed position, the radiator surface no longer overlaps the module wall. As previously described, at least one shield covers the pipe. Once again, a first stand-off distance separates the shield from the pipes.

A further aspect of the invention provides at least one gap shield that covers the gap sections that are between the radiator panel and the module. The gap shield is positioned over the gap section at a second stand-off distance that is the same or different from the first stand-off distance. Preferably, one first gap shield mounted on the radiator panel covers the gap section from the panel side, while a second gap shield mounted on the module, covers the gap section from the module side. Unattached ends of both gap shields allow the radiator panel to be folded in a stored position. As the radiator panel swings to its deployed position, the gap shield mounted on the panel swings with the panel until its unattached end overlaps the unattached end of the gap shield mounted on the module. This helps shield the gap section when the panel is in a deployed position.

The disclosed shielded radiator panel can significantly reduce the amount of material required to protect the radiator pipe. Further, the reliability of the radiator panel is not compromised because a shield separated by a stand-off distance from the pipes protects against impact damage better than solid reinforcement of the pipes. Furthermore, mounting the pipes on a flat panel surface is easier than embedding the pipes within two thick panel sections.

BRIEF DESCRIPTION OF THE DRAWINGS

FIG. 1 illustrates a satellite payload module with three radiator panels embodying the invention deployed away from the walls of the module, and one radiator panel embodying the invention folded in its stored position.

FIG. 2 is a view of the invention where a section of the shielding on radiator panel 12(a) of FIG. 1 is cut away to reveal the pipes mounted on the radiator panel and two gap shields covering the gap section of the pipe between the radiator panel and the module.

FIG. 4 is a cross-sectional view of the invention across line A-A' in FIG. 1 of the radiator panel 12(a) with its pipes attached to one surface, and a shield mounted by its edges on the radiator panel at a stand-off distance from the pipe.

FIG. 5 is a cross-sectional view of the invention across B-B' of radiator panel 12(a) in FIG. 2 of overlapping shields, curved to accommodate the curvature of the flexible end, covering the portion of the flexible end that is exposed when the panel is deployed.

DETAILED DESCRIPTION OF THE PRESENTLY PREFERRED EMBODIMENTS

Figure 3:
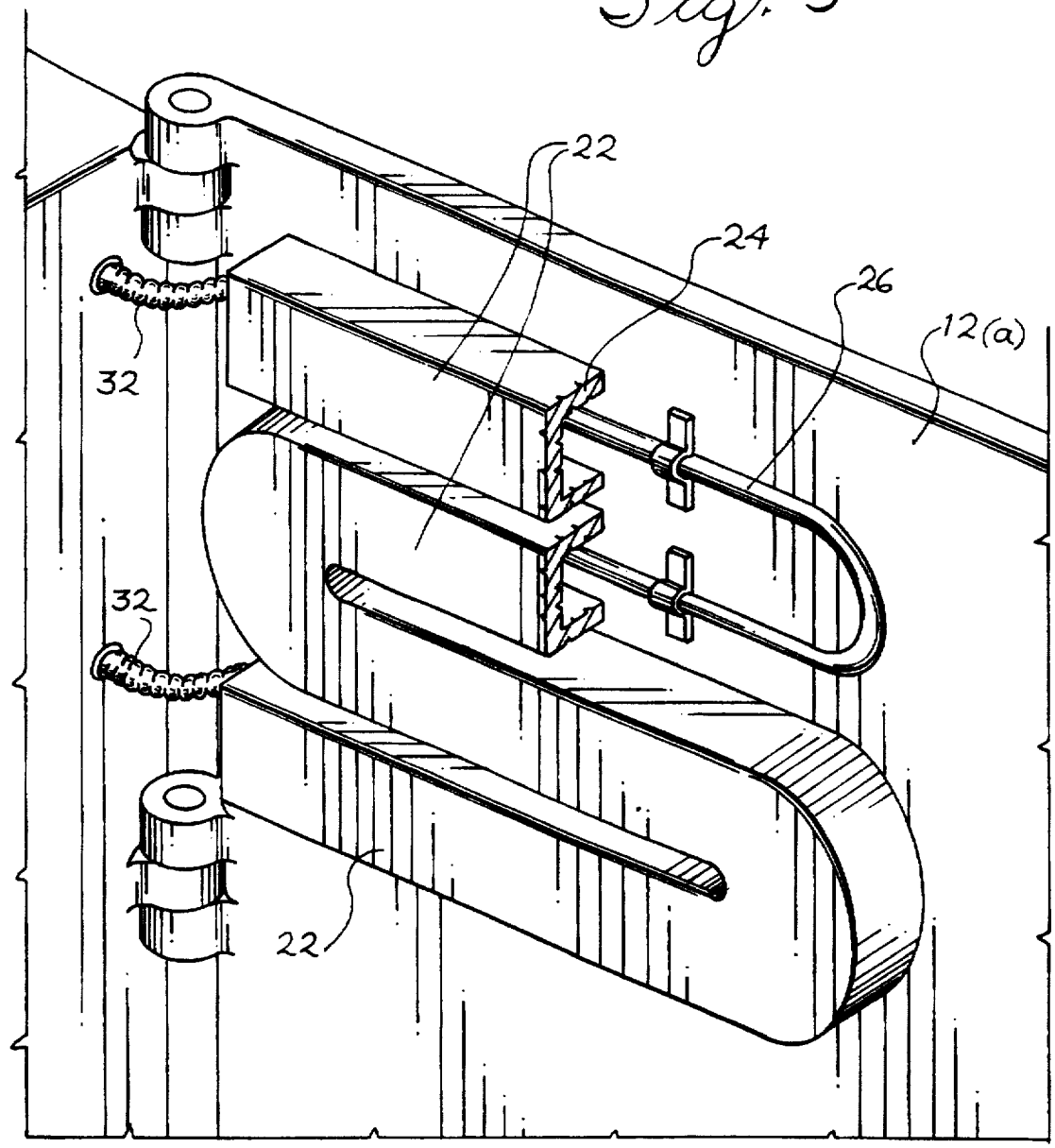
FIG. 3 illustrates an alternative embodiment of the invention where the radiator panel 12(a) in FIG. 1 employs a number of shields that are arrayed on the radiator panel to follow the path of the heat pipes that are on the radiator panel.

In the preferred embodiment, the spacecraft is a satellite that employs the present invention. The satellite has a body which includes a lower bus module and an upper payload module.

Attached to the aft end of the lower bus module are typically a plurality of engines. These engines typically include a centrally positioned liquid orbital thruster, four chemical propulsion engines located at the corners of the bus module and two pairs of Xenon ion propulsion engines. The lower bus module typically contains fuel tanks and various power and control modules which operate the engines and power the payload module. The typical bus module further includes a pair of solar panels which convert sunlight into electricity which is sent to batteries located on the bus module. The bus module also typically has a pair of receivers, such as antennas, which receive signals from a ground station on Earth which are used to control the satellite. The antennas also send signals to the ground station.

The payload module is typically attached to the bus module and contains a variety of electronic equipment which may contain a number of sensors. The electronic equipment processes information gathered by sensors and sends the processed information back to the ground station via the antennas. The gathered information may concern communications, weather observation, navigational information, etc.

FIG. 1 illustrates a satellite module 10 employing four radiator panels, 12(a), 12(b), 12(c) and 12(d), embodying the present invention. The module 10 has four side walls 14 attached to a base that meet at four corners. At each corner are a pair of hinges 16 which are hingedly attached to one of the radiator panels 12(a)–12(d) via a pivot member so that the radiator panel is able to rotate about an axis 20 defined by the hinges. In FIG. 1, radiator panel 12(d) is folded in a storage position against the exterior wall 14 of module 10. When the spacecraft reaches its destination the radiator panels are deployed to the extended positions as illustrated by radiator panels 12(a), 12(b) and 12(c).

By cutting away a section of the shield on radiator panel 12(a), FIG. 2 exposes a radiator pipe 26. While the pipe may be mounted on any base that can help conduct heat away from the coolant, the preferred embodiment employs a radiator panel having a first surface 30. A bumper shield 22 is positioned over each said first surface 30 and covers the pipe on each radiator panel. The shield and the pipe is separated by first stand-off distance 28. In the preferred embodiment, shield edges 24 extend from the stand-off distance to the radiator panel. The radiator pipe is encased within a structure defined on one side by the radiator panel and on the remaining sides by the bumper shield. However, it is not necessary to enclose the pipes within a casing comprising the radiator panel and the shield to practice the invention.

The two ends of the pipe are attached to the module so that the pipe forms a loop. Coolant that is heated within the module circulates from the module through the pipes on the radiator panel. After the radiator panel dissipates the heat, the coolant circulates back into the module, and the cycle is repeated. Any pipe configuration which allows coolant to circulate from the module to the panel and back to the module is within the scope of the invention. FIG. 2 also illustrates the flexible ends 32 of the pipe. The flexible ends allow the pipe to bend as the radiator panel swings on the axis 20 defined by the hinge.

In the preferred embodiment, the flexible ends 32 are located in the gap 50 between the radiator panel and the module. Thus for the purposes of illustrating the preferred embodiment, the gap section of the pipe will be referred to as flexible end 32. However, the flexible ends need not be located in the gap. The flexible end could be located over the radiator panel or within the module as long as the flexible end is close enough to the gap to provide the flexibility needed by the pipe as the panel swings from one position to another. In any case, when the radiator panel is deployed, a gap section of the pipe is exposed by the gap between the radiator panel and the module. Such gap sections may be covered by at least one gap shield, preferably two, as illustrated by cutting away a section of gap shields 34 and 36 on radiator panel 12(a) in FIG. 2.

The shielding in FIG. 1 contemplates a one piece shield 22. The cut away section in FIG. 2 illustrates a pipe 26 preferably attached, by flanges 38, to a first surface 30 on radiator panel 12(a). Bolts, welds or adhesives may substitute for or supplement the flanges in attaching the pipes to the radiator panel. As an alternative embodiment, FIG. 3 illustrates an array of shields 22. As shown by cutting away some of the shields 22, the shields are mounted to follow pipe 26. Although the gap sections are not protected by gap shields in this illustration, such protection is within the scope of the invention.

Different types of shields may be used to protect the radiator pipes. One shield is the aluminum whipple shield that consists of an aluminum front bumper at a stand-off distance from the pipes. Other shields include the multi-shock shield, the mesh double-bumper shield, and the hybrid aluminum multishock shield. The details of the latter shields involve multiple bumper configurations made from various materials. Those details are not required to illustrate this invention.

The preferred embodiment utilizes the whipple shield system, because it is currently the easiest to deploy with a deployable radiator panel. Although other shields excel in impact resistance and weight conservation, the multiple bumper layers employed by these shields are difficult to implement with a deployable radiator panel. However, radiator panels that use other types of shields as illustrated by, but not limited to, the multishock shield, the mesh double bumper shield and the hybrid aluminum multishock shield are within the scope of the invention.

A shielding system that employs a bumper shield at a stand-off distance from a vulnerable component provides better protection against impact than simply adding reinforcement material directly onto the vulnerable component. At the same time, the amount of material required for the bumper shield is less than the amount of material required for the reinforcement. The bumper shield disperses the energy of an initial impact by disintegrating and deflecting a projectile. Even if the projectile survives the initial impact, the subsequent layer is exposed to a less damaging residual impact. Thus the amount of material required to withstand the energy of an initial impact is negated by a bumper shield that can disperse the energy of the initial impact.

The effectiveness of such shielding is a function of: 1) the area that requires protection; 2) the vulnerability of the component to be protected; 3) the thickness of the shield; and 4) the stand-off distance between the shield and the vulnerable component. Each variable can add to or detract from the advantages that a stand-off shield provides. For example, increasing the bumper shield thickness will decrease the probability that a meteoroid will damage a vulnerable is component. However, that increase in protection may or may not off-set a concomitant penalty in weight. The stand-off distance, the thickness of each-bumper shield and the number of bumper shields used must all be optimized to reflect the weight added and the likely difficulty in manufacturing and implementing the system. For the presently preferred radiator panel, four mils (thousandths of an inch) of an aluminum bumper shield provide at least the same degree of protection as that of 100 mils of aluminum applied directly on top of radiator piping.

FIG. 4 is a cross sectional view of an edge created by a cut across line A to A' in FIG. 1. FIG. 4 illustrates pipe 26 resting on radiator panel 12(a). A bumper shield 22 covers pipe 26 at a first stand-off distance 28. Edge 24 of shield 22 extends towards the radiator panel and allows shield 22 to be mounted on panel 12(a) at the stand-off distance 28 from pipe 26.

FIG. 5 is a cross-sectional view of the gap between a radiator panel and the module as created by a cut across B-B' in FIG. 2. The cross-sectional view illustrates two gap shields covering a flexible end 32. The flexible end 32 is protected by gap-panel shield 34 and gap-module shield 36. Both shields are positioned about a second stand-off position 40 from flexible end 32.

Gap-panel shield 34 is attached to radiator panel 12 at a first gap-panel shield end 42. Gap-module shield 36 is attached to module 10 at a first gap-module shield end 46. Gap-panel shield 34 has a second gap-panel shield end 44 opposite the first gap-panel shield end 42. Gap-module shield 36 has a second gap-module shield end 48 opposite the first gap-module shield end 46. The gap shields are formed so that, with a given separation between the shields, second gap-panel shield end 44 may overlap second gap-module shield end 48. In this manner, flexible end 32 is protected against space debris.

The following specification is the preferred embodiment as presently contemplated by the inventor. The radiator panels are 37.5 by 84.0 by 0.020 inches of aluminum alloy. Two aluminum alloy pipes are mounted on each radiator panel with a total pipe length of 290 inches and walls that are minimally 30 mils thick. One aluminum bumper shield, 2–4 mils thick, covers each panel at a stand-off distance of 0.5 to 1.0 inch from the pipes. The bumper shield edges extend to the panel so that the pipes are encased by the shield and the panel. The pipes have flexible ends that are shielded by two aluminum alloy gap shields. The gap shields are 2 mils thick and shaped to conform with the shape of the flexible ends. The gap shields are positioned at a second stand-off distance of about 0.5 inch from the flexible ends.

Although the preferred embodiment employs pipes with flexible ends and hinges so that the radiator panels are deployable, the invention is not limited to deployable radiator panels. It should be understood that the preferred embodiment only describes the preferred aspects of the invention for purposes of clarity and does not limit the invention. From the description, one skilled in the art can ascertain the essential characteristics of the invention. Such persons would recognize that some changes and modifications to the invention would not be outside the scope of the claims that follow.

We claim:

1. A radiator panel comprising:
  a) a first radiator surface;
  b) at least one pipe, mounted on the first radiator surface;
  c) at least one bumper shield positioned over said first radiator surface at a first stand-off distance from the pipe; and
  d) at least one hinge, hingedly attached at a first panel edge, said hinge hingedly attachable to a spacecraft so that the radiator panel may be stored in a stored position against a wall of said spacecraft, said radiator panel able to swing on an axis defined by the hinge to a deployed position where the radiator panel surface extends away from said spacecraft;
  e) at least one gap shield attached over each gap section of the pipe located in a gap between the radiator panel and the spacecraft, said gap shield from the gap section by a second stand-off distance, wherein:
  f) the pipe comprises two flexible ends that may be attached to the spacecraft, the flexible ends allowing the pipe to bend flexibly when the radiator panel swings from its stored position to its deployed position; and
  g) the bumper shield and the gap shield are adapted to protect the pipe from impacts by micrometeoroids and the like.

2. The radiator panel of claim 1 wherein the bumper shields have edges that extend from the stand-off distance over the pipes to the radiator panel to encase the pipes.

3. The radiator panel of claim 1 wherein the radiator panel is attached to a spacecraft by the hinge and the pipe is attached by the flexible ends to the spacecraft.

4. The radiator panel of claim 1 wherein the bumper shield comprises 2 to 4 mils of aluminum, and the first stand-off distance is 0.5 to 1.0 inch.

5. The radiator panel of claim 1 wherein:
  a) one gap shield comprises a gap-panel shield attached at a first gap-panel shield end to the radiator panel, the gap-panel shield comprising a second gap-panel shield end opposite the first gap-panel shield end;
  b) a second gap shield comprises a gap-module shield attachable at a first gap-module shield end to the spacecraft, the gap-module shield comprising a second gap-module shield end opposite the first gap-module shield end;

c) the gap shields are formed so that, with a given separation between the gap shields, the second gap-panel shield end can overlap the second gap-module shield end; and d) the gap shields are positioned to shield the gap section exposed when said radiator panel swings to its deployed position.

6. The radiator panel of claim 1 wherein the gap shield comprises about 2 mils of aluminum, and the second stand-off distance is about 0.5 inch.

7. A method of making a radiator panel comprising the steps of:

a) providing a base having a first surface, said base forming a panel;

b) attaching at least one pipe on the first surface;

c) positioning at least one bumper shield over said first surface at a first stand-off distance from the pipe, the bumper shield being adapted to protect the pipe from impacts by micrometeoroids and the like;

d) attaching at least one hinge to a spacecraft and to a first panel edge of the panel so tat the panel may be stored against said spacecraft, said panel able to swing on an axis defined by the hinge to a deployed position;

e) forming at least two flexible ends on the pipe, the flexible ends attached to the spacecraft to allow the pipe to bend when the radiator panel swings from its stored position to its deployed position; and f) attaching at least one gap shield over each gap section of the pipe located in a gap between the radiator panel and the spacecraft, and separating said gap shield from the gap section by a second stand-off distance, the gap shield being adapted to protect the pipe from impacts by micrometeoroids and the like.

8. The method of claim 7 further comprising the steps of attaching the radiator panel to a spacecraft by the hinge, and attaching the flexible ends to the spacecraft.

9. The method of claim 7 further comprising the step of extending the edges of the bumper shield from the first stand-off distance to the panel to encase the pipe.

10. A method of circulating a coolant comprising the steps of:

a) providing at least one radiator panel comprising:
   i) a first radiator surface;
   ii) at least one pipe, mounted on the first radiator surface;
   iii) at least one bumper shield positioned over said first radiator surface at a first stand-off distance from the pipe, wherein the bumper shield is adapted to protect the pipe from impacts by micrometeoroids and the like; and
   iii) at least one hinge at the firs panel edge of the panel, the hinge attachable to a spacecraft so that the radiator panel may be stored against said spacecraft, the radiator panel able to swing on an axis defined by the hinge to a deployed position; wherein:
   iv) the pipe comprises two flexible ends attachable to the spacecraft, the flexible ends allowing the pipe to bend when the radiator panels swings from its stored position to its deployed position; and
   v) at least one gap shield is attached at a second stand-off distance over a gap section of the pipe that is exposed by a gap between the radiator panel and the spacecraft, wherein the gap shield is adapted to protect the pipe from impacts by micrometeoroids and the like;

b) at a selected destination, circulating a heated coolant through the pipes so that the heated coolant is cooled on the radiator panel; and c) deploying the radiator from its stored position to its deployed position at said selected destination.

11. The method of claim 10 wherein the radiator panel is attached to a spacecraft by the hinge, and the flexible ends are attached to the spacecraft.

12. The method of claim 11 wherein:

a) one gap shield comprises a gap-panel shield attached at a first gap-panel shield end to the radiator panel, the gap-panel shield comprising a second gap-panel shield end opposite the first gap-panel shield end;

b) a second gap shield comprises a gap-module shield attached at a first gap-module shield end to the spacecraft, the gap-module shield comprising a second gap-module shield end opposite the first gap-module shield end;

c) the gap shields are formed so that, with a given separations between the gap shields, the second gap-panel shield end overlaps the second gap-module shield end; and d) the gap shields are positioned to shield the gap section exposed when said radiator panel swings to a deployed position.

13. A method of claim 10 wherein:

a) first gap shield comprising a gap-panel shield attached at a first gap-panel shield end to the radiator panel, the gap-panel shield comprising a second gap-panel shield end opposite the first gap-panel shield end;

b) a second gap shield comprising a gap-module shield attachable at a first gap-module shield end to the spacecraft, the gap-module shield comprising a second gap-module shield end opposite the first gap-module shield end;

c) the gap shields are formed so that, with a given separations between the gap shields, the second gap-panel shield end can overlap the second gap-module shield end; and d) the gap shields are positioned to shield the gap section exposed when said radiator panel swings to its deployed position.

* * * * *